March 24, 1931.          F. DUSTAN          1,798,016
COMBINATION QUARTERING AND PIN TURNING MACHINE
Filed July 13, 1929     7 Sheets-Sheet 1

March 24, 1931.   F. DUSTAN   1,798,016
COMBINATION QUARTERING AND PIN TURNING MACHINE
Filed July 13, 1929   7 Sheets-Sheet 3

March 24, 1931. F. DUSTAN 1,798,016
COMBINATION QUARTERING AND PIN TURNING MACHINE
Filed July 13, 1929  7 Sheets-Sheet 4

Inventor
Frank Dustan
By Attorneys

March 24, 1931.  F. DUSTAN  1,798,016
COMBINATION QUARTERING AND PIN TURNING MACHINE
Filed July 13, 1929  7 Sheets-Sheet 5

Inventor
Frank Dustan
By Attorneys
Southgate Fay & Hardy

March 24, 1931.  F. DUSTAN  1,798,016
COMBINATION QUARTERING AND PIN TURNING MACHINE
Filed July 13, 1929   7 Sheets-Sheet 6

Inventor
Frank Dustan
By Attorneys
Southgate Fay & Hawley

March 24, 1931. F. DUSTAN 1,798,016
COMBINATION QUARTERING AND PIN TURNING MACHINE
Filed July 13, 1929 7 Sheets-Sheet 7

Fig. 12.

Inventor
Frank Dustan
By Attorneys
Southgate Fay & Hurley

Patented Mar. 24, 1931

1,798,016

UNITED STATES PATENT OFFICE

FRANK DUSTAN, OF FITCHBURG, MASSACHUSETTS, ASSIGNOR TO MANNING, MAXWELL & MOORE, INC., OF NEW YORK, N. Y., A CORPORATION OF NEW JERSEY

COMBINATION QUARTERING AND PIN-TURNING MACHINE

Application filed July 13, 1929. Serial No. 378,022.

This invention relates to a machine especially adapted for quartering locomotive wheel sets and for turning the worn crank pins, but the principles thereof are capable of being used for other purposes.

The principal objects of the invention are to provide a machine or attachment for the above purposes which will be compact and comparatively inexpensive and will be capable of turning pins and quartering; to provide a machine which, in its entirety, except for the bed, can be put on the bed between the head stock and tail stock of the usual journal turning machine simply by drawing them back, thus using the device as an attachment for the journal lathe for the above mentioned purposes; to provide a construction in which all mechanism beyond the face plate at both ends is eliminated and the two ends are constructed alike, being modified as necessary for adjusting one vertically and the other horizontally; to provide a mechanism which can be used with tools for turning and boring; to provide a construction which will be equally available for use for thirding, and to provide a hollow tool which is used for pin turning and can be used also for carrying the boring tool.

Other objects and advantages of the invention will appear hereinafter.

Reference is to be had to the accompanying drawings in which—

The invention is shown as comprising two units fixed to a bed 10. This lathe is provided with two supports 11 and 12 spaced apart. On account of the fact that the boring or pin turning will be done on the two ends at points at 90° from each other around a circle and the necessity of getting the mechanism close to the axial line of the work, the supporting dead centers 13 and 14 are offset, one is shown as offset horizontally and the other vertically. By this means the slides supporting the centers can be made sufficiently large to rigidly support the work and at the same time allow the mechanism to be brought into small compass as will appear. For quartering the dead centers are offset through an angle of 90° to each other, but for thirding they are offset through an angle of 120°.

The wheel-set 15 preferably is supported on jacks 16 which involve open-top V-shape supports for the journal. The wheel-set is lifted by a crane or other means and brought around into position and set on these V's and then they are adjusted vertically by nuts 17 to bring the wheel-set so that it will be in position to be supported on the two centers 13 and 14. These centers are then moved inwardly and the wheel-set is thus fixedly mounted and supported on the centers, but its weight can be supported mainly by the jacks. Then two clamps 19 are adjusted and secured to the wheels of the wheel-set to hold the wheel-set against turning. Thus the work is clamped firmly in position and supported by means which is well understood in this art and therefore is not described herein in detail.

It is the purpose of this machine to operate simultaneously on the two wheels either to bore the holes for the pins or to turn the pins, or, if desired, to bore the hole in one wheel and turn the pin on the other, simultaneously.

Figures 3, 4:
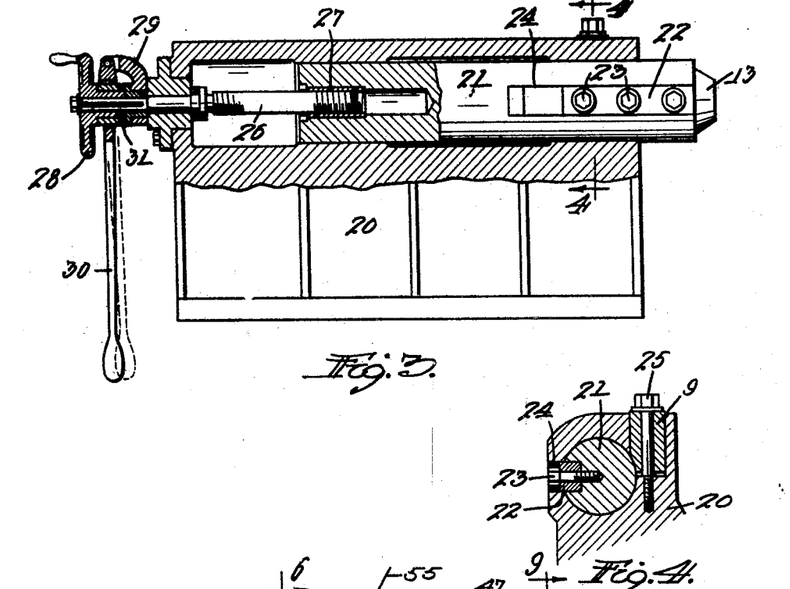
Fig. 3 is a sectional view on the line 3—3 of Fig. 2 showing the dead center in axial cross section.
Fig. 4 is a transverse sectional view of the same on the line 4—4 of Fig. 3.
Figure 5:
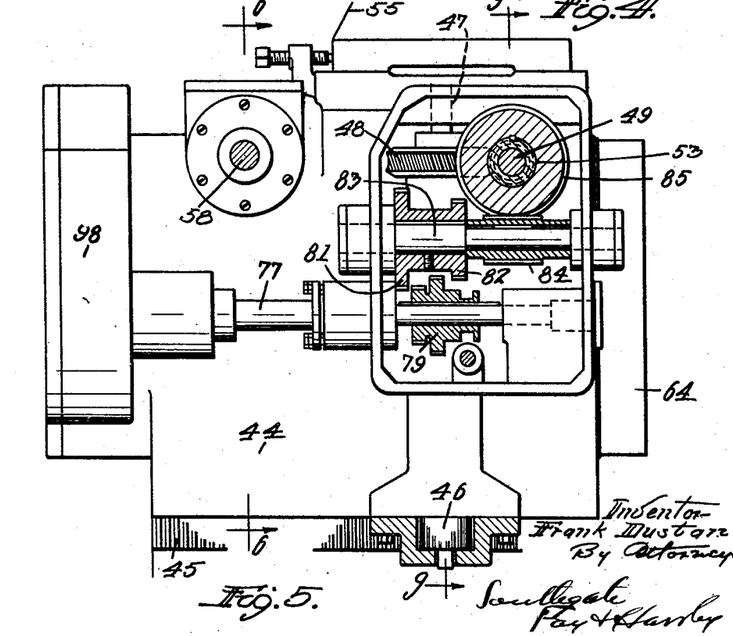
Fig. 5 is a vertical sectional view on the broken line 5—5 of Fig. 2.
Figure 6:
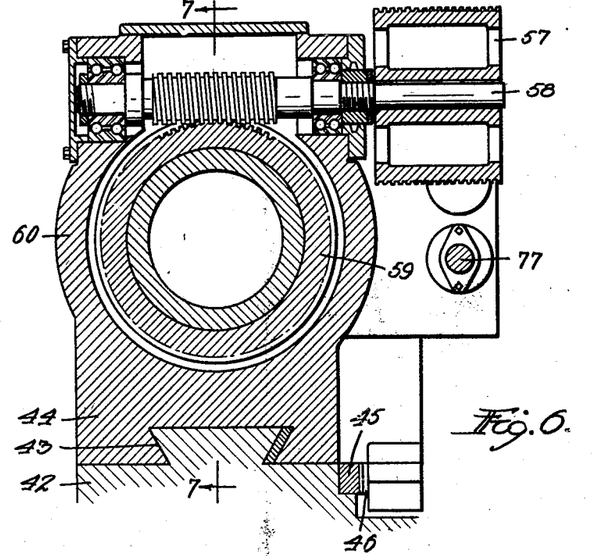
Fig. 6 is a transverse sectional view of the tool-operating means on the line 6—6 of Fig. 5.

The supports 11 and 12 are fixed to the bed 10 and they carry the supports 20 for the centers 13 and 14. One of these is shown in Fig. 3. This center 13 is mounted on a cylindrical slide 21 which is provided with a key 22 secured in its side by screws 23 and running in a slot 24 in the support 20 and integral with the center 13. This side of the support is in a vertical plane on this head but in a horizontal plane in the one at the opposite end. The slide 21 is clamped by a wedge 9 loose on a clamping screw 25.

Figure 12:
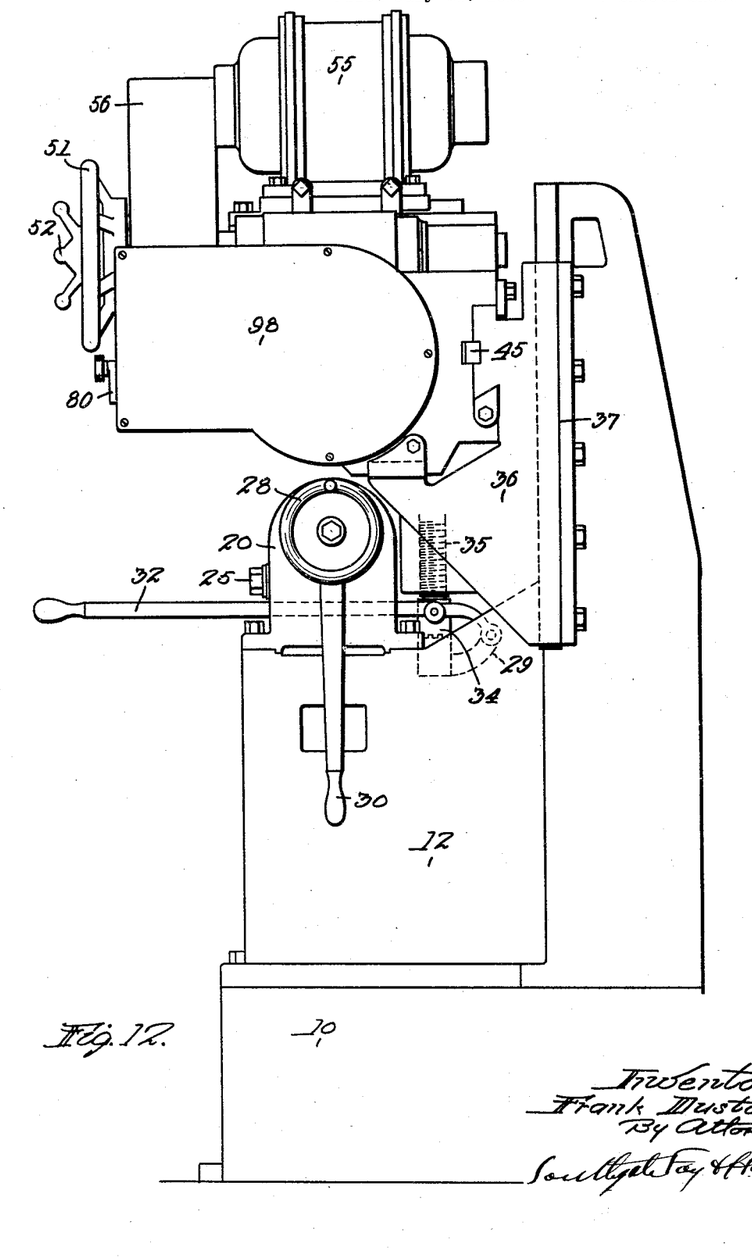
Fig. 12 is an end elevation of the opposite end of the machine.
Figure 13:
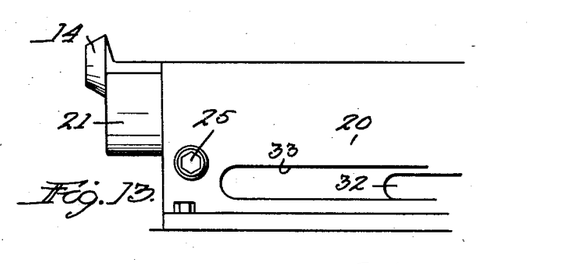
Fig. 13 is a side view of one of the off-set centers for the work at the same end.
Figure 14:
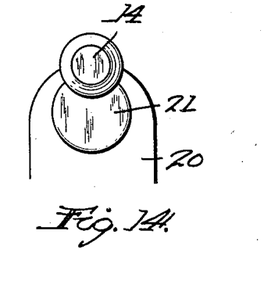
Fig. 14 is an end view thereof.

For moving the slide it is provided with a screw 26 entering a screw-threaded sleeve 27 fixed in the end of the slide and having on its end a hand wheel 28 for operating it. As the space in which this hand wheel can be located is comparatively small, due to the presence of other members around it, it does not provide enough leverage for the final tightening. For that reason an oscillating collar 29 is mounted on the shank of the screw 26 and is provided with a pivoted handle 30 and a clutch 31 operated by the handle. This handle can be turned to the dotted line position in Fig. 3 and swung to operate the screw and then disengaged and turned again, similar to a ratchet motion. At the other end the center 14 is offset upwardly, instead of sideways as on the left hand end, but the mechanism is substantially the same as indicated in Figs. 12, 13 and 14.

At this end a handle 32 extending horizontally projects through a slot 33 in the support 20 and has a clutch 34 for operating a vertical screw 35 which moves a head 36 up and down in vertical ways 37 to raise and lower the mechanism above. As this mechanism is substantially the same at this end as at the other end, except for its vertical adjustment, the other mechanism has been shown more in detail and the description will be applied thereto.

Figure 1:
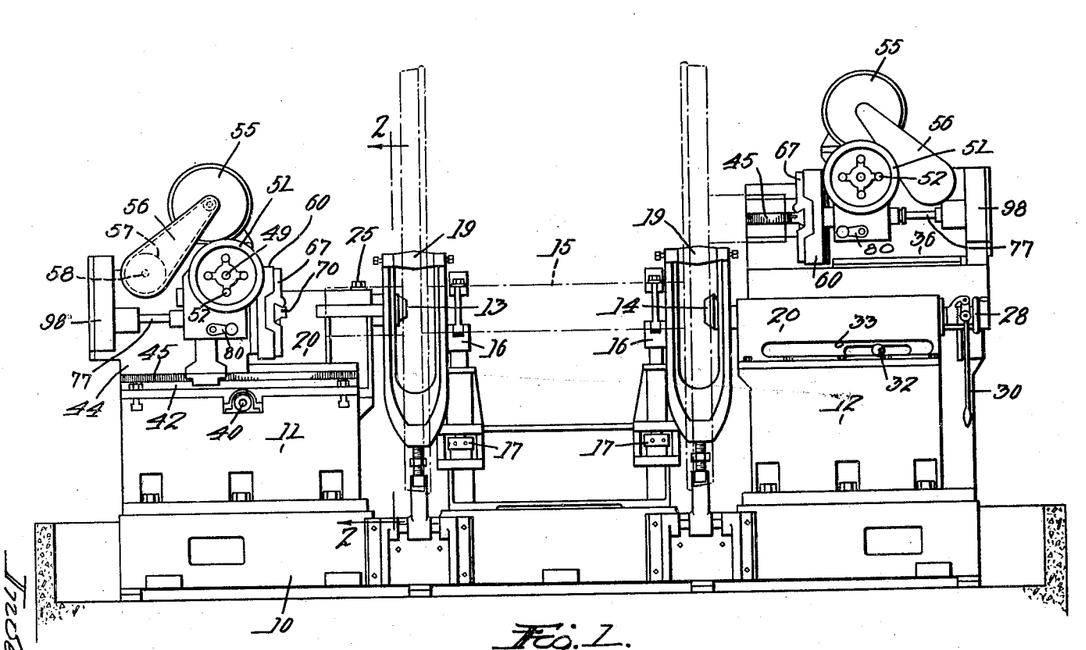
Fig. 1 is a side elevation of a machine constructed in accordance with this invention.

Referring now again to the left hand as shown in Fig. 1 the stationary support 11 also supports the tool operating mechanism and this comprises several parts. On this support is a screw 40 which, by means of a wrench can be turned to operate a nut 41 constituting a part of a transverse slide 42 so that this slide can be moved toward and from the center 13 which, on account of the center 13 being off-set to the left and its inner surface being flat and vertical, the slide 42 can be adjusted comparatively close to the axis of the wheel-set. This slide 42 has ways 43 which carry a longitudinally movable slide 44 and this slide has a rack 45 along its side. With this rack meshes a pinion 46 carried by the slide 44. This pinion is located on a vertical shaft 47 which, by means of worm and gear 48 is rotated by a horizontal shaft 49, carrying the worm, for feeding the slide 44 longitudinally and thus moving the cutting tool along the work. This feed may be performed by hand or power.

The hand feed is provided through the shaft 49 on which is one element 51 of a friction clutch in the form of a hand wheel. The other element 50 of this clutch is keyed to a sleeve 53. The hand wheel 51 will turn the pinion 46 by hand when the clutch is open. A nut 52 swiveled on the shaft 49 and screwing on the hand wheel 51 opens and closes the feed clutch 50, 51.

The power for driving the tool at each end of the machine is supplied by a motor 55 through a chain or belt in a case 56 to a wheel 57 fixed on a shaft 58 mounted in ball bearings and supported crosswise on the slide 44. This shaft has a worm which operates a worm gear 59 arranged axially and operating the boring or turning tool. The gear 59 is located in a housing or casing 60 constituting an integral part of the longitudinal slide 44. It is fixed by screw collars and the like 61 to a hollow tool holder 62 which is mounted to rotate in this casing. The casing 60 has a cylindrical integral bearing surface 63, at one end in which the holder 62 is held in position so as to rotate therein and avoid chattering while the other end is held in a bearing member 66 provided between the surfaces of the casing and holder, one of its surfaces being conical. On the extreme end of the casing 60 is a flange 64 and gland 65 of ordinary well known construction to retain the lubricant. This provides for the rotation of this tool supporting holder 62.

Figure 2:
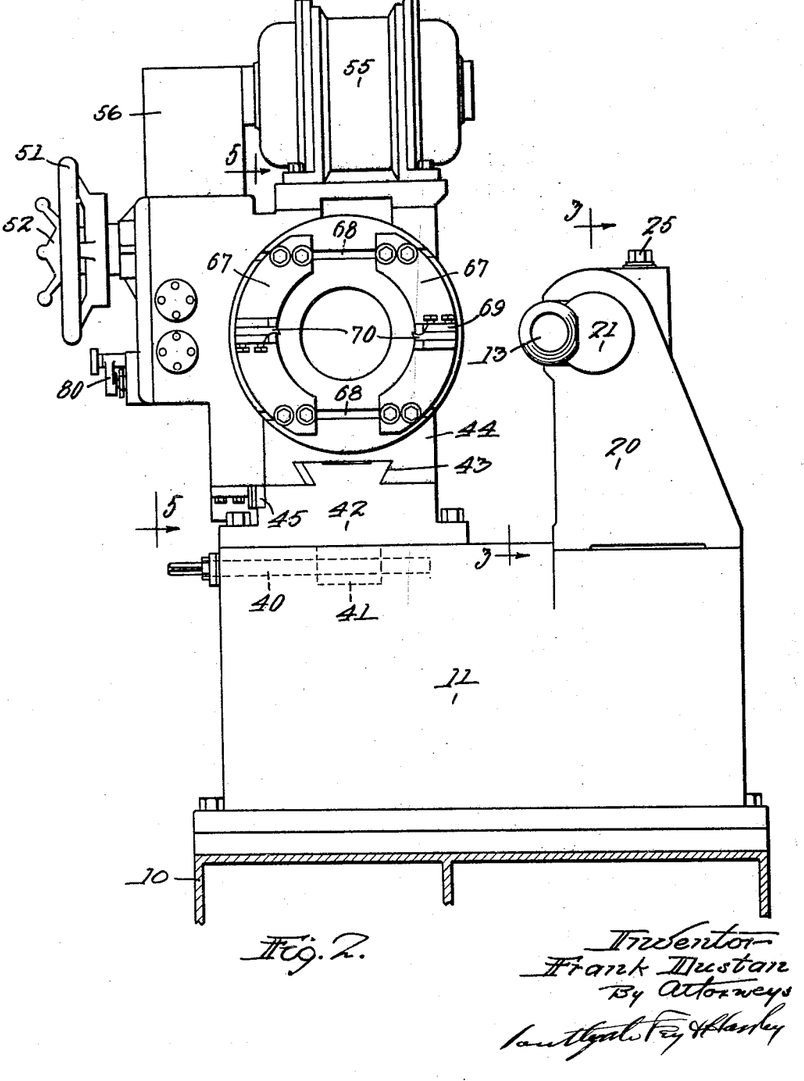
Fig. 2 is a sectional view on the line 2—2 of Fig. 1, showing one end of the machine in inside end elevation.
Figure 7:
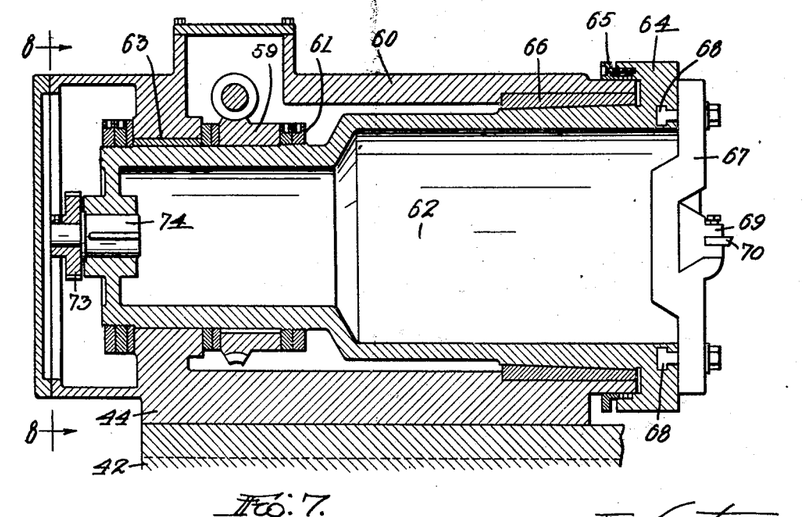
Fig. 7 is a longitudinal sectional view of the tool holding means on the line 7—7 of Fig. 6.

It may be stated here that this holder can support tools for turning the exterior of the pins as shown in Figs. 2 and 7. A pair of plates 67 are bolted in T-slots 68 in the end of the hollow holder 62 and carry in clamps 69 two cutting tools 70. On the other hand it can be used to carry a boring bar 71 mounted in a carrier 72 which is also fixed in the T-slots 68.

Figure 8:
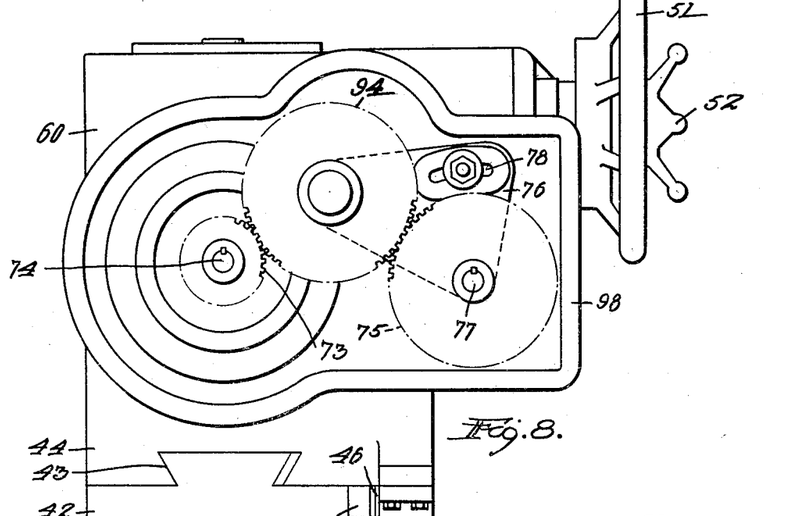
Fig. 8 is an end view of the tool advancing gearing, with the end cap removed, as indicated by the line 8—8 in Fig. 7.
Figure 9:
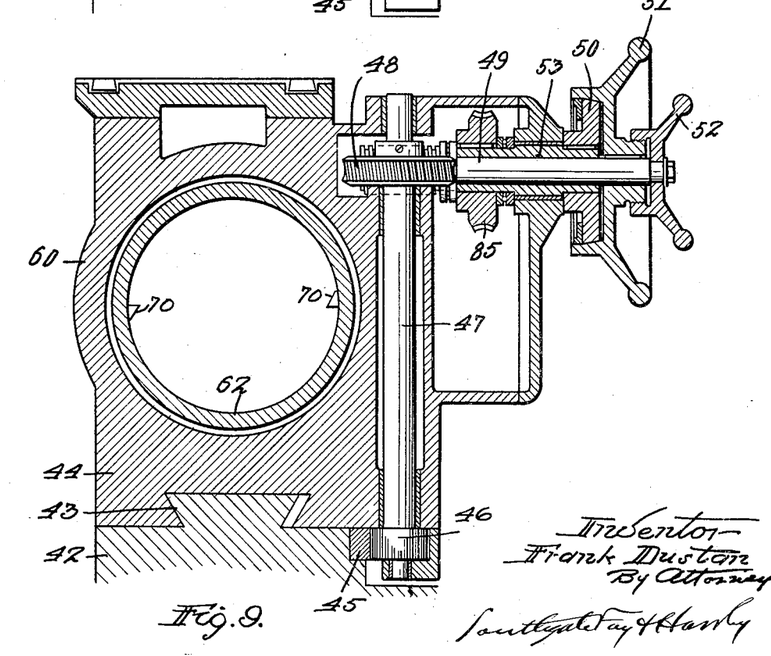
Fig. 9 is a sectional view of the means for moving the tool longitudinally, taken on the broken line 9—9 of Fig. 5.
Figure 10:
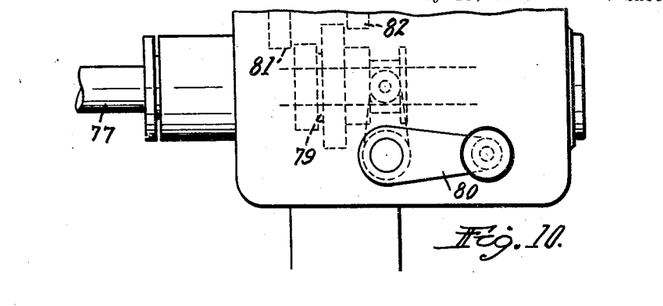
Fig. 10 is a side view of the means for controlling the speed of longitudinal motion of the tool.
Figure 11:
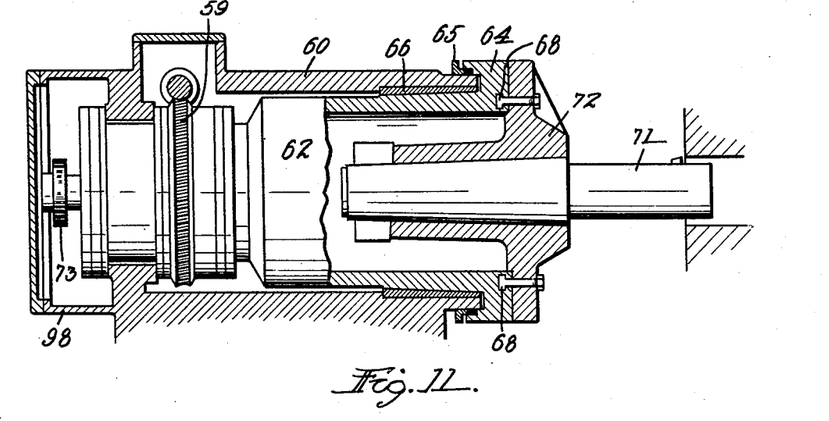
Fig. 11 is a diametrical sectional view of the tool supporting means shown as carrying a boring tool.

It has been described how this tool holder is rotated and adjusted forward and back by hand. Also it is fed forward by power through a gear 73 which is secured to a stud 74 which is centered and fixed in the end of the tool holder 62. This gear meshes with a gear 94 which in turn meshes with a gear 75 as shown in Fig. 8. The gear 94 is on a plate 76 which is adapted to be turned on the axis of the shaft 77 on which the gear 75 is located and through an adjustment 78 the gear 73 can be changed for a gear of a different size to alter the speed.

The gears just described are mounted in a gear box 98. The shaft 77 extends from the side of this gear box and is provided with a pair of sliding gears 79 adapted to be operated by a handle 80 to throw them in or out of mesh with two unequal gears 81 and 82, or out of mesh with either, for the purpose of changing the feed. The gears 81 and 82 are mounted on a shaft 83 which, by means of a worm 84 drives the sleeve 53 through a worm gear 85 on the sleeve.

It will be seen therefore that the pinion 46 is operated by hand for adjustment or other purposes common in this industry and can be driven by power to feed the tool forward as it rotates, and that the feed can be changed by a definite ratio on the machine.

In the use of the machine the wheel-set 15 is deposited by a crane on the jacks 16, if they are used, and they are adjusted to the proper elevation and positioned. The centers 13 and 14 are moved forward in the manner that has been described and the wheel set accurately centered by them. The clamps 19 are then fixed and the opposite wheels can be bored at spots 90° from each other, simultaneously, or the pins in position can be turned off on the outside and these two operations can be carried on at both ends or one operation at one end and the other at the other end.

The slide 44 is adjusted to the proper position laterally by the screw 40 and the corresponding slide 36 is adjusted vertically by the screw 35. After adjustment the boring or turning tools at both ends feed inwardly at the same time and, as the length of the surface to be finished is substantially the same in both cases, the two operations will consume about the same time and be finished together.

This constitutes a compact, strong and durable machine which, to perform the operations described occupies very much less space than has been thought possible heretofore and involves economy in manufacture and upkeep. It can be used as an attachment for a journal lathe for the purpose of quartering and pin turning by drawing back the head stock and tail stock and inserting these attachments between them. The two ends of the machine are substantially alike although having some differences as has been stated. The operator can control everything from the front and ends and never has to go around to the back, while running the machine.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a metal working machine, the combination with two opposed supports, guides thereon out of alignment with each other, slides supported by the guides, and centers carried by said supports in axial alignment, but one offset horizontally toward the work from the center of its slide and the other at a vertical distance toward the work from the center of its slide, of rotary metal working means for the opposite ends of the work, one located with its axis in the horizontal plane of the horizontally offset center and the other in the vertical plane of the vertically offset center and both of them closer to the axis of the work than would be possible with concentric centers, said slides both being located on the side of their respective centers opposite their respective metal working means.

2. In a metal working machine, the combination with two supports at opposite ends of the machine, guides thereon out of alignment with each other, and centers carried by said supports in axial alignment, one offset at a distance from the center of its slide and the other at a distance from the center of its slide, said centers being offset from the slides at right angles to each other, whereby said slides can be located out of alignment with the axis of the work, of rotary metal working means for the opposite ends of the work, both of them being located on the side of the slide toward which their respective centers extend, whereby the metal working means can be brought closer to the axis of the work than would be possible with concentric centers.

3. In a metal working machine, the combination with a pair of off-set dead centers for supporting the work at opposite ends, and cylindrical slides on which the centers are mounted eccentrically, of a rotary tool holder at each end of the machine adjacent to said centers and each located with its axis in lateral alignment with the axis of its center and the axis of the slide on which said center is mounted, so as to be capable of moving to a point near its center, means for moving each of said holders toward and from its center in a direct line for adjustment and means for rotating said tool holders.

4. In a metal working machine, the combination with a bed and two supports fixedly secured to the bed at a distance from each other, means between said supports for supporting a heavy piece of work, offset dead centers carried by said supports for centering the work, a slide on one of said supports adjustable horizontally toward and from its dead center in the direction in which the center is offset, and a slide on the other support adjustable vertically toward and from its dead center in the direction in which the center is offset, of a tool holder carried by each slide and means for rotating each tool holder and simultaneously feeding it in the direction of the axis of said dead centers.

5. In a metal working machine, the combination of a support, a slide adjustable longitudinally on said support, means for holding the slide in adjusted position, means for moving the slide longitudinally, a dead center carried by said slide for centering the work, a second slide movable longitudinally and adjustable laterally toward and from the dead center, a hollow tool holder carried by the latter slide and rotatable therein, means at the outer end of the tool holder for supporting a metal working tool, means for rotating said tool holder, a gear carried by the tool holder and means operated by said gear for traversing the last named slide longitudinally for feeding the metal working tool along the work.

6. In a metal working machine, the combination with a longitudinally movable slide, a rack along the slide and a pinion meshing with the rack for moving the slide, of a center for supporting the end of the work, a hollow tool holder mounted in said slide to turn therein, means for rotating the tool holder, a gear on the axis of said tool holder rotatable therewith, a train of gearing connected with said gear having a replaceable gear for speed changes, a shaft to which said train of gearing delivers power, a shaft having a hand wheel thereon, speed-change gears for connecting said two shafts, means for transmitting power from the hand wheel shaft to said pinion for operating the pinion either by the hand wheel or by power and means for disconnecting the said shafts for preventing turning the pinion by power.

7. In a metal working machine, the combination with a movable slide, a rack along the slide and a pinion meshing with the rack for moving the slide, of a center for supporting the end of the work, a tool holder mounted in said slide to turn therein, means for rotating the tool holder, a gear on said tool holder rotatable therewith, a train of gearing connected with said gear, a shaft to which said train of gearing delivers power, a shaft having a hand wheel thereon for connecting said two shafts, means for transmitting power from the hand wheel shaft to said pinion for operating the pinion either by the hand wheel or by power and means for disconnecting the said shafts for preventing turning the pinion by power.

8. In a pin turning and quartering machine, the combination with a pair of opposite supports, means for centering and supporting a wheel-set and means for holding the wheel-set in fixed position, of means at one end of the machine for turning a pin or quartering the wheel-set arranged to operate on an axis horizontally in line with that center of the wheel-set and means at the other end of the machine for turning a pin or quartering the wheel-set arranged to operate on an axis vertically in line with the center.

9. In a metal working machine, the combination of a support, having a passage therein, of a slide adjustable in said passage, a screw having a hand wheel for adjusting the slide, a clutch on the screw, a collar oscillatable on the clutch, a lever pivoted on the collar and having a clutch section engaging said clutch and rotating the screw and means for holding the slide in adjusted position.

10. In a machine for boring and pin-turning locomotive wheel-sets, the combination with two supports at opposite ends of the machine having guides out of alignment with each other, slides on said guides, and dead centers carried by said slides in axial alignment with each other, said dead centers each being offset at a distance from the center of its respective slide in different directions, of rotary means at each end of the machine for turning or boring at the opposite ends of the work, said rotary means being located at a substantial angle from each other around the offset centers.

11. In a machine for boring and pin-turning a locomotive wheel-set, the combination with two supports at opposite ends of the machine, guides thereon out of alignment with each other, slides carried by said guides, and dead centers in axial alignment with each other and each carried by one of said slides, said dead centers being offset at a distance from the center of their respective slides and at a substantial angle from each other around the axis thereof, of a pair of hollow rotary tool holders at the opposite ends of the machine located at a substantial angle from each other around the offset centers, each tool holder having an open end adapted to be provided with means either for turning a pin or boring, each of said tool holders being adjustable toward and from its dead center in a radial direction.

12. In a metal working machine, the combination of a support, a slide adjustable longitudinally on said support, means for moving the slide longitudinally, an offset dead center carried by said slide for centering the work, a second slide movable longitudinally and adjustable laterally toward and from the dead center in the direction in which the center is offset, a tool holder carried by the latter slide and rotatable therein, and means at the outer end of the tool holder for supporting a metal working tool.

13. In a metal working machine, the combination of a support, a slide carried thereby, means for supporting a rotary metal working tool and a dead center carried by the slide in an eccentric position toward the metal working tool, the axis of the dead center being located substantially at the edge of said support so that the tool can be adjusted close to the dead center.

In testimony whereof I have hereunto affixed my signature.

FRANK DUSTAN.